United States Patent

[15] 3,652,877

Smith

[45] Mar. 28, 1972

[54] RADIATION COMPENSATION CIRCUIT

[72] Inventor: Richard A. Smith, Ellicott City, Md.

[73] Assignee: The United States of America as represented by the Secretary of the Navy

[22] Filed: May 14, 1969

[21] Appl. No.: 824,634

[52] U.S. Cl.....................307/308, 328/67, 307/310, 307/252 K, 250/83.3 R, 328/210, 307/305, 317/149

[51] Int. Cl.........................H03k 3/31, H03k 3/37

[58] Field of Search..................307/310, 308, 311, 252; 330/23, 32, 69, 59, 33, 69; 250/83.3 R, 83.3; 328/67

[56] References Cited

UNITED STATES PATENTS

| | | | |
|---|---|---|---|
| 1,657,396 | 1/1928 | Herbig | 330/59 |
| 1,811,895 | 6/1931 | Ranger | 330/69 |
| 2,259,323 | 10/1941 | Peterman | 330/59 |
| 2,436,741 | 2/1948 | Bussey | 330/69 |
| 2,964,685 | 12/1960 | Raymond | 330/59 |
| 3,368,074 | 2/1968 | Wilcox | 250/83.3 |
| 3,524,999 | 8/1970 | Fletcher et al | 330/33 |
| 2,588,292 | 3/1952 | Rittner | 330/69 |
| 2,748,202 | 5/1956 | McCallister | 330/69 |
| 2,839,620 | 6/1958 | Waldhauer | 330/23 |
| 2,859,402 | 11/1958 | Schaeve | 307/310 |
| 3,026,455 | 3/1962 | Smith | 330/69 |
| 3,114,057 | 12/1963 | Caruso | 330/69 |
| 3,178,995 | 4/1965 | Hartman | 330/69 |
| 3,222,599 | 12/1965 | Gerwitz | 330/69 |
| 3,289,105 | 11/1966 | Funfstuck | 307/310 |

Primary Examiner—Donald D. Forrer
Assistant Examiner—Harold A. Dixon
Attorney—J. O. Tresansky, R. S. Sciascia and J. A. Cooke

[57] ABSTRACT

A radiation hardened circuit utilizing an energy storage capacitor to supply power to a load via a magnetic coupler. Triggered unidirectionally conductive active circuit elements connected between the capacitor and the magnetic coupler provide a discharge path for the capacitor to transfer power to the load during normal operation but provide another discharge path for the capacitor, inhibiting transfer of power to the load, when the circuit is exposed to radiation.

1 Claims, 2 Drawing Figures

Richard A. Smith
INVENTOR

BY J.O. Tresansky
ATTORNEY

3,652,877

RADIATION COMPENSATION CIRCUIT

BACKGROUND OF THE INVENTION

This invention relates generally to radiation hardened circuitry and more particularly to a radiation hardened actuating circuit.

Circuit hardening may be broadly defined as any technique utilized in obtaining radiation-tolerant circuitry, that is circuitry unaffected by the presence of gamma rays, X-rays, or the like.

Previously, circuits utilized in a gamma ray or X-ray environments were forced to employ vacuum tubes or electromechanical relays as the active elements of the circuit since these components are essentially unaffected by gamma ray or X-ray radiation. These circuits, however, are in general less reliable, physically heavier, larger in size and slower in response than corresponding circuitry utilizing gas thyratrons or semiconductive devices such as SCR's or the like. Unfortunately, the gamma ray or X-ray radiation cause the gas of the thyratron to ionize and induce photocurrents to flow in the semiconductive devices, and, therefore, bring about premature or undesirable operation of the circuitry employing these devices.

To overcome undesirable operation of circuitry utilizing gas thyratrons or semiconductive devices subjected to radiation circuit hardening techniques have been devised. These hardening techniques may include component selection and use, feedback, clamping, cancellation, time sequencing, circumvention and modification of environment. These heretofore employed techniques are somewhat unreliable, expensive, or inadequate and, therefore, have been unable to provide circuits adequately immune to gamma or X-ray radiation. For example, prior art circuit hardening utilizing cancellation techniques have required careful matching of circuit components and may be ineffective if the radiation level of the environment is changed. Similarly, prior art circuit hardening utilizing circumvention have required redundant systems and, therefore, are unecomonical and bulky.

SUMMARY OF THE INVENTION

Accordingly, one object of the invention is to provide improved radiation immune circuitry.

Another object of the present invention is to provide an improved radiation hardened initiating circuit.

A still further object of the instant invention is to provide an improved radiation circuit that is economical, reliable and simple.

These and other objects of the present invention are obtained by providing a circuit hardening technique which utilizes the trigger radiation sensitive nature of gas thyratrons or semiconductive devices, or the like, to eliminate circuit outputs produced by the radiation.

BRIEF DESCRIPTION OF THE DRAWING

A more complete understanding of the invention and many of the attendant advantages thereof will be readily appreciated as the same becomes better understood by reference to the following detailed description when considered in connection with the accompanying drawings wherein.

DESCRIPTION OF THE PREFERRED EMBODIMENTS

Figure 1:
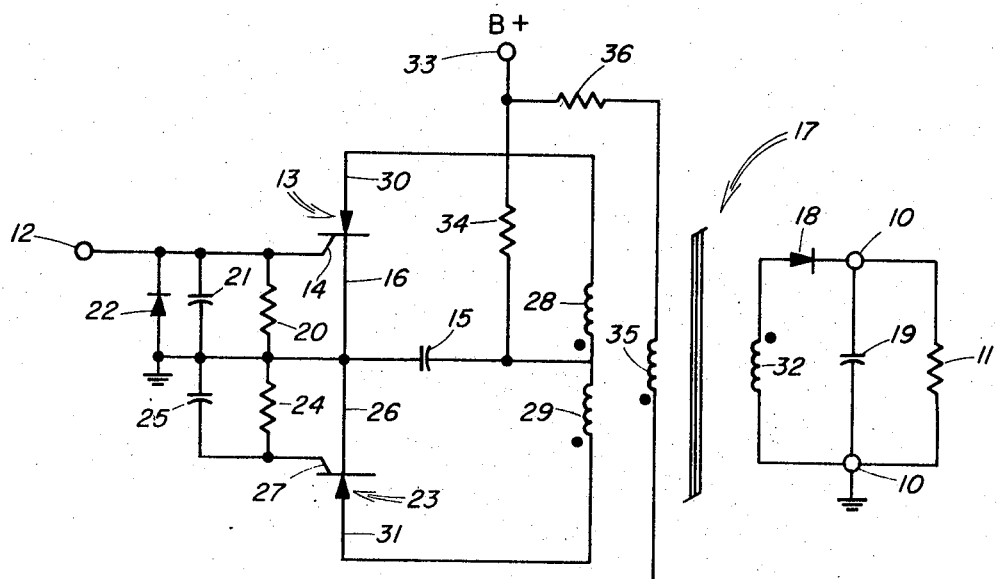
FIG. 1 is a circuit diagram of one embodiment of the invention.

Referring now to the drawing and more particularly to FIG. 1 thereof wherein a hardened circuit according to the present invention is shown as a firing circuit or the like adapted to provide an output signal at output terminals 10 to a load, represented by resistor 11, when the circuit is triggered by a signal applied at an input terminal 12. The trigger signal applied at terminal 12 may be a positive pulse obtained from a controlled pulse source (not shown). The trigger signal may control conduction of a bistable semiconductor switch element, such as, for example, a SCR 13 the gate 14 of which is connected to terminal 12. Triggering of SCR 13 enables an energy storage device, such as a capacitor 15, connected between the cathode 16 of the SCR and a magnetic coupling device generally indicated at 17, to discharge. The discharge energy of the capacitor is transferred, via the magnetic coupling device, and delivered to resistor 11, representative of any desired load, by way of a unidirectionally conductive device, such as semiconductor diode 18, connected between the magnetic coupler 17 and resistor 11. Additional elements, such as a capacitor 19 connected across the load terminals 10, may be included for controlling the output rise time or otherwise modifying the output signal as may be desirable.

Appropriate bias for SCR 13 is provided by a resistor 20 and a capacitor 21 parallel connected across gate 14 and cathode 16 of SCR 13 as will be explained more fully hereinafter.

A unidirectionally conducting device, such as a semiconductor diode 22, also may be connected between the gate and cathode terminals of SCR 13 to inhibit radiation triggering of SCR 13 when the circuit is subjected to a marginal X-ray or gamma ray environment, as will be explained more fully hereinafter. A parallel connected resistor 24 and capacitor 25 may be connected between the cathode 26 and the gate 27 of an additional bistable semiconductor switch, such as SCR 23 to provide biasing of SCR 23.

By way of example, magnetic coupling device 17 may be a saturable core reactor or transformer, the core material of which exhibits a square loop characteristic. More specifically, the saturable core transformer may include substantially identical input windings 28 and 29 connected between capacitor 15 and SCR's 13 and 23, respectively. Thus, winding 28 may be connected to the anode 30 of SCR 13 and winding 29 may be connected to the anode 31 of SCR 23. An output winding 32 may be connected across load terminals 10 via diode 18 to transfer the discharge energy of capacitor 15 to the load 11. Capacitor 15 may be charged from an energy supply, such as voltage B+, from a terminal 33 by way of a resistor 34 connected therebetween. The transformer may also include a reset winding 35, connected to the energy supply through a resistor 36, to insure that the transformer core is set at its zero state.

In operation, when a supply voltage B+ is applied to terminal 33, capacitor 15 charges to approximately B+ volts at a rate determined by resistor 34. Similarly, current flows from terminal 33 through resistor 36 to the transformer reset winding 35 insuring that the square loop core is in its zero state. This allows the transformer to take full advantage of the core material hysteresis range.

If a positive pulse is applied to input terminal 12 from an outside source (not shown), SCR 13 will be rendered conductive allowing capacitor 15 to discharge through transformer winding 28 thereby inducing a positive voltage in windings 29 and 32 as indicated by the polarity markings. The positive voltage induced in output winding 32 causes a current to be passed, by diode 18, and supplied to load resistor 11. It is to be noted that a positive pulse applied to terminal 12 will trigger SCR 13 but will not trigger SCR 23 since the cathode 26 of SCR 23 is connected to ground. As hereinafter explained, SCR 23 will also be inhibited from triggering caused by the "$dv/dt$ phenomenon" when SCR 13 is normally triggered.

Eventually, the transformer coil saturates causing winding 28 to essentially short circuit and allowing capacitor 15 to rapidly complete its discharge through SCR 13. With capacitor 15 discharged, SCR 13 becomes nonconductive since the resistance of resistor 34 is too large to supply the current needs of SCR 13. Thus, the circuit returns to its "ready" state, that is, capacitor 15 will again be charged by the energy supplied at terminal 33 and the circuit will require only a trigger pulse at terminal 12 to supply power to load 11. To insure that the SCRs are not rendered conductive by the $dv/dt$ phenomenon, that is conduction caused by abrupt voltage changes on the anodes causing displacement current to flow and trigger the SCR's, and to further insure that leakage current will not trigger the SCR's resistors 20 and 24 and capacitors 21 and 25 are connected across SCR's 13 and 23, respectively.

As hereinbefore explained, gas thyratrons and semiconductive devices, such as SCR's, may be prematurely triggered if subjected to a radiation environment including gamma or X-rays. Thus, if the circuit of FIG. 1 is subjected to a radiation environment, of sufficient magnitude, SCR 13 will be rendered conductive, capacitor 15 charged from terminal 33 will discharge and power delivered to load resistor 11 absent the circuit hardening feature of the present invention.

When the circuit of FIG. 1 is exposed to gamma or X-ray radiation, SCR 13, as hereinbefore explained, is rendered conductive allowing capacitor 15 to discharge wherein current flows counterclockwise through winding 28. At the same time, however, the radiation causes SCR 23 to conduct. It is noted that SCR 23 is not normally triggered by a pulse at terminal 12 but is only triggered by the action of the gamma or X-ray radiation. Thus, capacitor 15 also discharges through a path including SCR 23 and transformer winding 29 wherein current flow is clockwise through the winding. Therefore, the currents flowing through winding 28 and winding 29 generate magnetic fields which are in opposition to each other and effectively cancel. Thus, there is virtually no magnetic coupling to output winding 32 and, therefore, very little voltage induced therein and no significant power supplied to load 11. It is readily apparent, therefore, that the firing of SCR 23 due to exposure to a radiation environment prevents the capacitor discharge voltage from affecting the load.

If the circuit is subjected to a marginal gamma or X-ray field, it is important, as hereinbefore explained, that SCR 23 be triggered into conduction. Assuming that the marginal field initially triggers only SCR 13, then the discharge of capacitor 15 through winding 28 will induce a voltage in winding 29. This induced voltage will cause a voltage change at the anode 31 of SCR 23. This $dv/dt$ phenomenon, which is usually suppressed by the parallel connected resistor 24 and capacitor 25 absent a radiation field, will be sufficient to trigger SCR 23, which is sensitized due to the radiation field, allowing only nominal voltage to reach load 11. Thus, SCR 23 will be triggered almost simultaneously with SCR 13 to provide circuit hardening.

If the circuit is exposed to a marginal field and only SCR 23 is triggered, capacitor 15 will discharge through winding 29. Since the saturable transformer 17 is biased in the zero state, SCR 23 will be unable to induce much voltage at winding 32. Furthermore, the voltage induced in winding 32 will be negative and blocked by diode 18. Diode 22 connected between the gate and cathode of SCR 13 acts as a negative bias when exposed to the radiation and, therefore, slightly desensitizes SCR 13. Thus, this insures that if the circuit is subjected to a radiation environment, then SCR 23 will trigger either simultaneously with or without triggering of SCR 13 which, in either case, prevents the radiation from prematurely affecting the load. Similarly, resistors 20 and 24 may be chosen to be of a value to insure that SCR 23 is triggered without or simultaneously with SCR 13.

Figure 2:
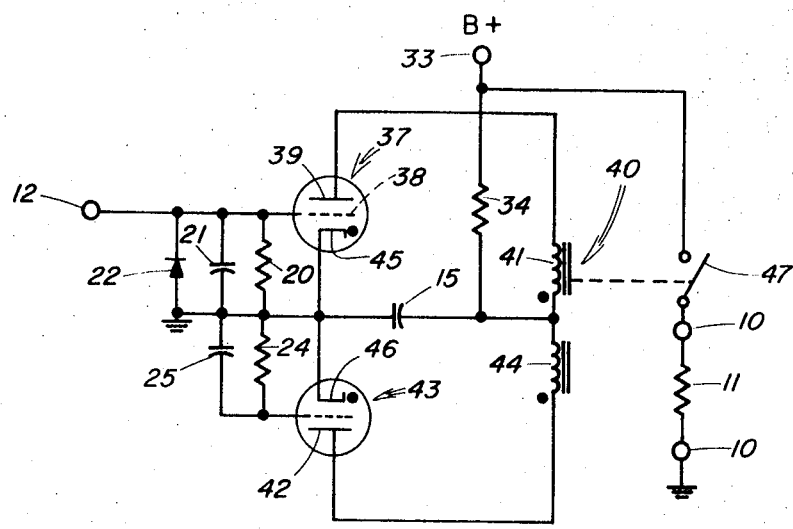
FIG. 2 is a circuit diagram of an alternative embodiment of the invention.

Referring now to FIG. 2, an alternative embodiment of the present invention is shown as including a triggered unidirectionally conductive device, such as gas thyratron 37 adapted to be normally triggered at input terminal 12 through a grid 38. The plate 39 of the thyratron is connected to one side of a magnetic coupling device, such as an electromechanical relay 40 or the like. More particularly, plate 39 is connected to a relay coil winding 41 of the relay. Similarly, the plate 42 of a triggered unidirectionally conductive device, such as gas thyratron 43, is connected to a relay coil winding 44 of relay 40. The cathodes 45 and 46 of gas thyratrons 37 and 43, respectively, are commonly connected to energy storage capacitor 15.

The operation of the circuit of FIG. 2 is similar to that of FIG. 1. Capacitor 15, charged to B+ volts from terminal 33, discharges through winding 41 when gas thyratron 37 is triggered at terminal 12. Current through winding 41 closes a switch 48 located between load resistor 11 and supply terminal 33 to allow power from terminal 33 to be supplied to the load. Under these circumstances, gas thyratron 43 is not rendered conductive.

If, however, the circuit of FIG. 2 is exposed to radiation in the form of X-rays or gamma rays or the like, then both gas thyratrons will be rendered conductive and capacitor 15 will discharge through winding 44 as well as winding 41. The magnetic fields generated in the relay windings cancel and switch 48 remains open. The relay may be such that switch 48 is closed only when capacitor 15 discharges through winding 41 while switch 48 remains open when the capacitor discharges through both windings 41 and 44 or through winding 44 alone the latter which may arise due to exposure to marginal fields.

Thus, it is readily apparent that the instant invention provides improved radiation tolerant circuitry. It will be understood by those skilled in the art that although the invention is described as employing similar unidirectional trigger devices, such as SCR 13 and SCR 23, these elements need not be exactly balanced or matched as in heretofore employed conventional radiation hardened circuits. Thus, the magnetic feedback of the magnetic coupling device requires only that the devices be triggered at approximately the same radiation level. Similarly, since the circuits, once triggered, are independent of the external influence of the radiation, the circuits may readily handle transient radiation fields whose values vary greatly or those which persist for a long period of time.

Obviously, numerous modifications and variations of the present invention are possible in the light of the above teachings. Thus, it may be possible to use stacked SCR's, properly biased, to increase the voltage capabilities of the circuit of FIG. 1. Similarly, other magnetic coupling devices, such as a pulse transformer or the like, may be utilized.

What is claimed as new and desired to be secured by Letters Patent of the United States is:

1. A radiation hardened circuit comprising
   energy storage means for storing an energy signal supplied thereto,
   first triggered unidirectional switch means for completing a first discharge path for said energy storage means, said first triggered unidirectional switch means triggered by an external pulse supplied thereto and triggered by exposure to a radiation environment,
   second triggered unidirectional switch means for completing a second discharge path for said energy storage means, said second triggered unidirectional switch means triggered only by exposure to said radiation environment,
   means for inhibiting triggering of said second unidirectional switch means by said external pulse supplied to said first triggered unidirectional switch means,
   saturable core transformer means including a first input winding in said first discharge path and a second input winding in said second discharge path responsive to the discharge of said energy storable means through said first discharge path for transferring power to an output winding and thence to an output terminal, said windings generating opposing magnetic fields when said energy storage means discharges through said first and said second discharge paths thus inhibiting the transfer of power when the circuit is exposed to a radiation environment; and
   unidirectional semiconductive switch means connected between said output winding and said output terminal to inhibit power transfer to said output terminal when said energy storage means discharges through said second discharge path.

* * * * *